United States Patent [19]
Filip

[11] 3,870,846
[45] Mar. 11, 1975

[54] CABLE ACTIVATED SWITCH

[75] Inventor: Stanislaw F. Filip, Don Mills, Ontario, Calif.

[73] Assignee: I.C.S. Ignition Control Systems Ltd., Montreal, Quebec, Canada

[22] Filed: Sept. 18, 1973

[21] Appl. No.: 398,375

[52] U.S. Cl............................. 200/161, 200/153 F
[51] Int. Cl. ............................................. H01h 17/08
[58] Field of Search............ 200/16 A, 61.77, 61.87, 200/61.88, 61.89, 153 F, 161

[56] References Cited
UNITED STATES PATENTS

| | | | |
|---|---|---|---|
| 3,435,165 | 3/1969 | Lombard | 200/161 X |
| 3,591,748 | 7/1971 | Holden | 200/161 |
| 3,703,620 | 11/1972 | Watanabe | 200/161 |
| 3,726,264 | 4/1973 | Lariviere | 200/161 X |

*Primary Examiner*—G. Harris

[57] ABSTRACT

A cable activated switch comprising a switch support body having a through bore. A first switch contact member is retained on the body. A second switch contact member is further slidingly retained on the body and insulated therefrom. Clamping means are provided for securing the cable passing through the bore. First resilient means are provided to bias the contact members. The first and second contact members are displaced relative to each other by predetermined axial movement of the cable which passes through the support body.

15 Claims, 4 Drawing Figures

CABLE ACTIVATED SWITCH

BACKGROUND OF INVENTION a. Field of the Invention

The present invention relates to a switch and more particularly to a cable activated switch.

b. Description of Prior Art

The present invention has particular application, although not exclusively, to braking systems as utilized on recreational vehicles such as snowmobiles, motorcycles, etc., where a brake handle lever is normally secured to a handle bar of the vehicle and pulls a brake cable to activate a brake mechanism, for example brake discs. With these known braking systems the brake lights for the vehicle are normally activated by a switch associated with the brake mechanism and actuable by compressing the casing or housing of the brake mechanism and controlled by the brake cable. A disadvantage of this type of brake light activating system is that the brake lights are not activated soon enough upon activation of the brake handle lever and the light is switched off too rapidly upon release of the lever or of the compression on the brake mechanism. A further disadvantage is that many of these brake light switches are difficult to install because of their structures and placement in the brake system. The main problem is that the compressing of the housing results in the loss of at least one third of the brake handle travel, thereby reducing braking efficiency.

SUMMARY OF INVENTION

It is a feature of the present invention to provide a cable switch which will cause the brake light of a vehicle to be actuated substantially immediately upon initial travel of the brake handle and released shortly before the compression is entirely released.

It is a further feature to provide a cable activated switch which is easily securable on the brake cable and activated thereby.

According to the above features, from a broad aspect, the present invention provides a light activating switch comprising a switch support body having a through bore. A first switch contact member is retained on the body. A second switch contact member is further slidingly retained on the body and insulated therefrom. Clamping means are provided for securing the cable passing through the bore. First resilient means are provided to bias the contact members. The first and second contact members are displaced relative to one another by predetermined axial movement of the cable which passes through the support body.

BRIEF DESCRIPTION OF DRAWING

A preferred embodiment of the present invention will now be described with reference to the accompanying drawings wherein.

DESCRIPTION OF PREFERRED EMBODIMENTS

Figure 1:
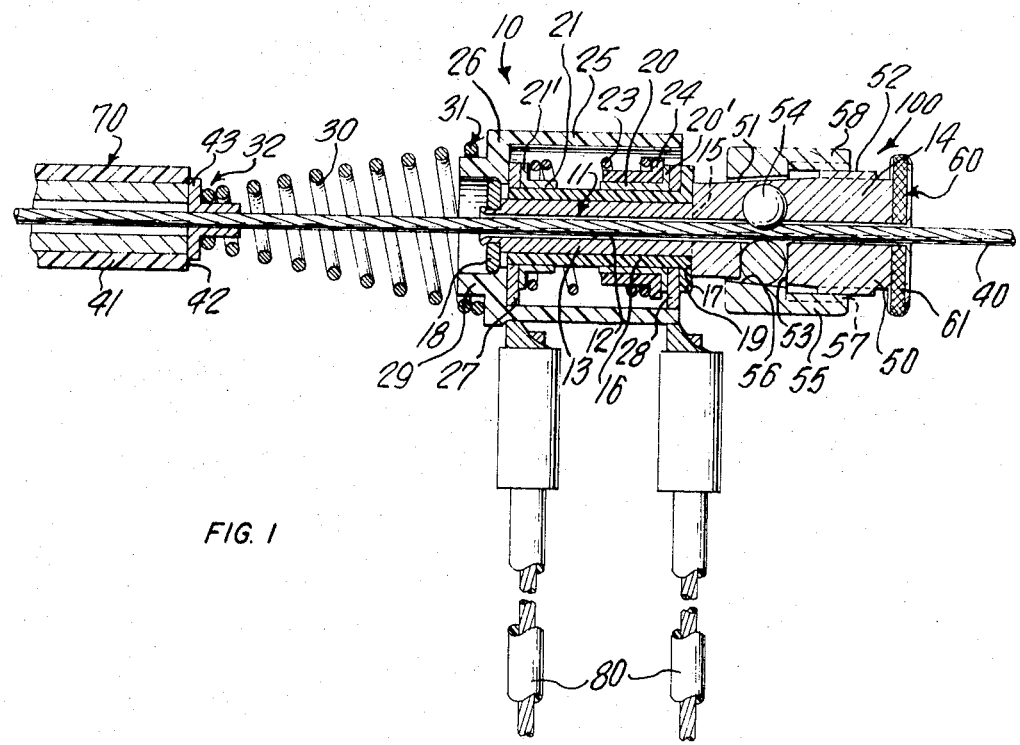
FIG. 1 is a fragmented cross-sectional view of the brake light switch of the present invention and associated cable.

Referring to the drawings and more particularly to FIG. 1 there is shown, generally at 10, the cable activated switch according to the present invention and adapted to operate switch contacts in the normally open position. The switch 10 comprises a switch support body 11 having a through bore 12. Herein shown, the switch support body 11 has a switch support section 13 and a clamping section 14. The clamping section 14 may be formed separately and to constitute a clamping means 100. If a separate clamping means 100 is provided, it will abut the switch support section 13 as indicated at phantom lines 15.

An insulating sleeve 16 is positioned about the outer surface of the switch support section 11 and is retained thereon between a shoulder portion 17, formed in the support body 11 and a washer 18 retained, by suitable means, in one end of the support body 11. As shown, the insulating sleeve 16 is provided with an annular shoulder end portion 19 abutting against the shoulder 17. A first and a second annular switch contact member 20 and 21, respectively, are positioned over the insulating sleeve 16 and each having an upstanding shoulder portion 20' and 21', respectively. A helical spring 23, constituting a second resilient means, urges the contacts 20 and 21 apart, is positioned between the shoulder portions 20' and 21'. An insulating annular ring member 24 is positioned in direct contact over the first switch contact member 20 to receive an end of the helical spring 23 to electrically isolate the first switch contact 20 from the spring 23.

A cylindrical switch cover 25 having an end wall 26 is positioned over the contacts 20 and 21 with the end wall 26 retained over the insulating sleeve 13 between the washer 18 and a connector lug 27 which is in direct contact with the shoulder portion 21' of the second switch contact 21. A further connector lug 28 is positioned between the shoulder portion 19 of the insulating sleeve and in contact with the sleeve portion 20' of the first contact 20. The end wall 26 of the housing 25 is provided with an annular extension sleeve 29 extending outwardly of the end wall 26.

A conical helical spring 30 having a large diameter end 31 and a small diameter end 32 is positioned over a wire or cable 40 extending in through bore 12 of the support body 11. The large diameter end 31 abuts against the end wall 26 of the housing 25 about the annular extension sleeve 29. The small diameter end 32 of the helical spring rests against the end 42 of a cable cover 41 positioned a predetermined distance adjacent the end wall 26 of the housing 25. A protective sleeve 43 may be held in a stationary position against the end 43 of the cable cover 41 to receive the small diameter end 32 of the helical spring. The protective sleeve would provide for free movement of the wire 40 therethrough, and at the same time protects the end of the cable cover and provides a better support for the small diameter end of the helical spring 30. The spring 30 constitutes a first resilient means.

As mentioned hereinabove the clamping means 100 may be formed integrally with the switch support body 11 or else formed separately as a separate entity constituting a clamping device. In the present embodiment, where it is formed integrally, the clamping means comprises a circular clamp body member 50 having a tapered outer surface portion 51 and a threaded outer portion 52. The through bore 12 extends through the clamp body member 50, as shown. Three transverse circular bores 53 are formed in the clamp body section 50 and each extend from the tapered outer surface 51 to the through bore 12. A ball 54 is positioned in each of the transverse bores 53. The ball is of larger diameter than the depth of the transverse bore 53, the depth being the distance taken from the tapered outer surface 51 closest to the threaded portion 52 and extending to the inner surface of the through bore 12.

A cylindrical locking sleeve 55 having a tapered inner surface portion 56 and a threaded inner portion 57, for engagement with the threaded portion 52, is provided and retained over the clamp body 50 with its tapered inner surface 56 extending substantially parallel to the tapered outer surface 51 of the body 50. As the locking sleeve 55 is threaded on the body 50 the inner surface of the sleeve 55 will engage with the ball 54 to push each ball in the transverse bore to squeeze the cable between the balls. Also, it is within the ambit of the present invention to provide only one transverse bore 53 with a ball 54 therein whereby the ball 54 will squeeze the wire 40 against the inner surface of the through bore 12 when it is clamped by the sleeve 55. However, the ball 54 will require a longer transverse displacement to function in this manner and therefore the depth of the transverse bore 53 must be substantially smaller than the diameter of the ball 54. The free end of the clamp body 50 is formed in a shoulder portion 60 having a gripping outer surface 61. The outer surface 58 of the cylindrical locking sleeve 55 may also have a gripping surface to facilitate the tightening thereof over the clamp body section 50. It is also within the ambit of the present invention to provide a separate securing means to lock and urge the inner tapered surface of the sleeve against the outer tapered surface of the body 50. Thus, it would not be necessary to provide the threaded portions 52 and 57 and the body 50 of the clamping means 100 may not have the shape as shown in the preferred embodiment disclosed above.

In operation, a brake cable 70 is stripped from its cable cover 41 to expose a section of wire 40 extending from the end 42 of its cover. The cable activated switch 10 is positioned over the wire 40, with the wire 40 extending therethrough in its through bore 12. The switch 10 is slid over the wire 40 until the small diameter end 32 of the conical helical spring 30 abuts the end 42 of the cable cover 41 or else the protective sleeve 43, if provided. The large diameter end 31 of the helical spring 30 abuts against the housing 25 but does not apply any pressure thereagainst. With the switch in this position the cylindrical locking sleeve 55 is threaded onto the clamp body 50 to rigidly secure the switch 10 over the wire 40, as discussed hereinabove. The free end of the wire 40 is then hooked up to the braking mechanism of the vehicle (not shown). The respective electrical wires 80 of the brake light (not shown) are connected to a respective ones of the connector lugs 27 and 28.

When the brakes of the vehicle are to be applied a hand lever provided on the handle bar (not shown) of the vehicle is activated drawing the wire 40 into the cable cover 41 causing the switch support body 11 and its associated parts to move towards the end 42 of the cable cover 41. The switch cover 25, the second switch contact 21 and the lug 27 will remain substantially stationary because the helical spring 30 is pushing against the switch cover 25 and further because the spring 30 has a higher compression rate than the helical spring 23 positioned between the contacts 20 and 21. Thus, as the support body 11 is displaced towards the end of the cable cover 41, the first switch contact 20 will come into electrical contact with the second contact 21. As can be seen, by varying the length of the switch contacts the distance required for the contacts to engage can be varied. Also, this distance can be varied by providing suitable visible markings on the switch so that during installation the helical spring 23 can be slightly compressed before clamping the switch onto the wire 40 and thus bringing the contacts closer together making the switch more sensitive.

Once the switch contacts 20 and 21 have engaged and the wire continues to be pulled inwardly into the cable cover to activate the brake mechanism, the entire switch 10 including the cover will then compress the conical helical spring 30 towards the brake cable end 42 maintaining electrical connection between contacts 20 and 21 and thus maintaining the brake light activated. As the brake lever is released it can be seen that the brake light remains activated until the conical helical spring 30 has reached its fully extended uncompressed condition and the first switch contact starts separating from the second switch contact due to the force exerted by the helical spring 23 positioned between the contacts. Therefore, it can be seen that with the cable activated switch 10 of the present invention the brake light is energized substantially throughout the braking period or axial displacement of the cable 40.

Figure 2:
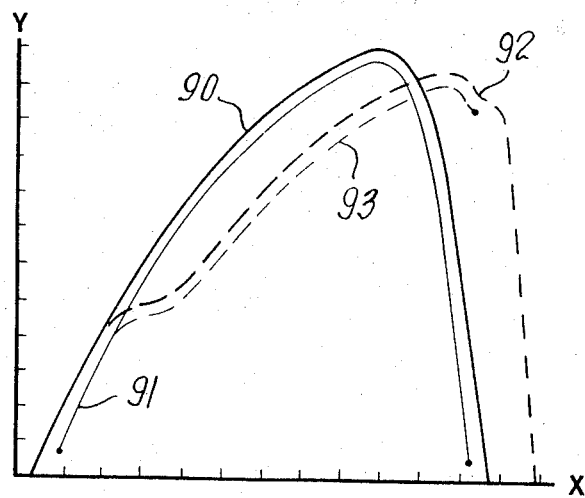
FIG. 2 is a characteristic curve of the brake curve and brake light energizing period of the device of the present invention and a known brake mechanism.

Referring to FIG. 2 there is shown a brake curve 90 of a particular braking system employing the cable activated switch 10 of the present invention. The characteristic curve 91 illustrates the energizing period of the brake light. The braking curve 92 is that of a known prior art braking system and the characteristic 93 illustrates the period in which the brake light is energized by the system represented by the braking curve 92. It can be seen that with the present invention that the brake light (characteristic curve 91) is activated at a very small braking distance and at a much earlier time than that of the prior art (characteristic brake curve 93). Also, the brake light is released at a much later braking distance as illustrated by the descent portion of the braking curves 90 and 92. With the prior art, as soon as the braking distance or braking compression is released, shortly thereafter the brake light is switched off. This is due to the fact that the prior art lights are activated by predetermined compressions whereas in the present invention it is activated by axial movement of the brake cable.

Figure 3:
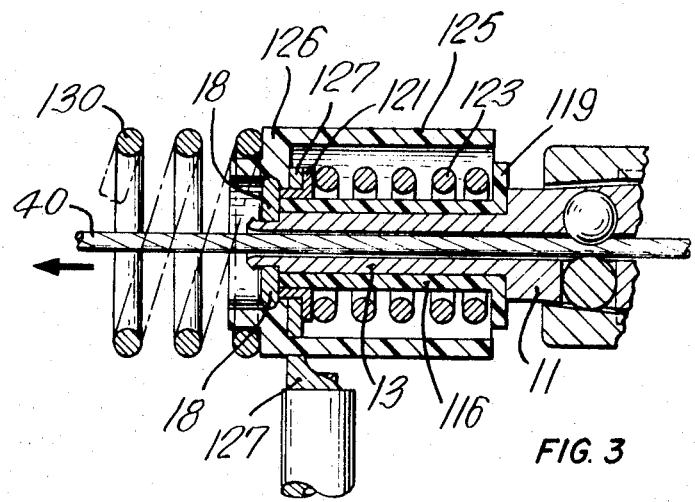
FIG. 3 is a fragmented sectional view of a further embodiment of the switch.

FIG. 3 shows a further embodiment of the switch 10 where the switch employs normally closed contact members for an installation where it may be required that a lamp or other device (not shown) be energized or connected into a circuit by opening circuit contacts rather than closing them. In this particular embodiment, the resilient means 123, herein shown as a helical spring, is positioned between the shoulder end portion 119 of the insulating sleeve 116 positioned over the switch section 13 of the support body 11. A connector lug 127 is located about a switch contact member 121 positioned about the sleeve 116 at the other end thereof. The contact member 121 is pushed against the action of the spring 123 against the metal washer 18 secured to the end of the body 11. A cylindrical switch cover 125 is positioned about the switch support section 13 in a similar manner as disclosed relative to FIG. 1. A conical helical spring 130 also abuts against the end wall 126 of the housing 125 in a manner as disclosed in FIG. 1.

The second switch contact in this particular embodiment is constituted by the metallic washer 18 secured in the free end of the switch support body 11. Thus, there exists a closed circuit between the first contact 121 and the second contact or washer 18 in the normal condition. When the switch is not activated by the wire 40, connector lug 127 is connected to ground through the washer 18, the body 11, the wire 40 and the connection (not shown) of the wire 40 to the brake mechanism.

In operation, when the wire 40 is pulled through the support body 11, as disclosed hereinabove in relation to FIG. 1, the helical spring 123 is compressed and the washer 18 moves away from the contact 121. The spring 130 is then compressed. The contacts 121 and 18 will remain "open" until the wire is released and springs 130 and 123 have decompressed.

Figure 4:
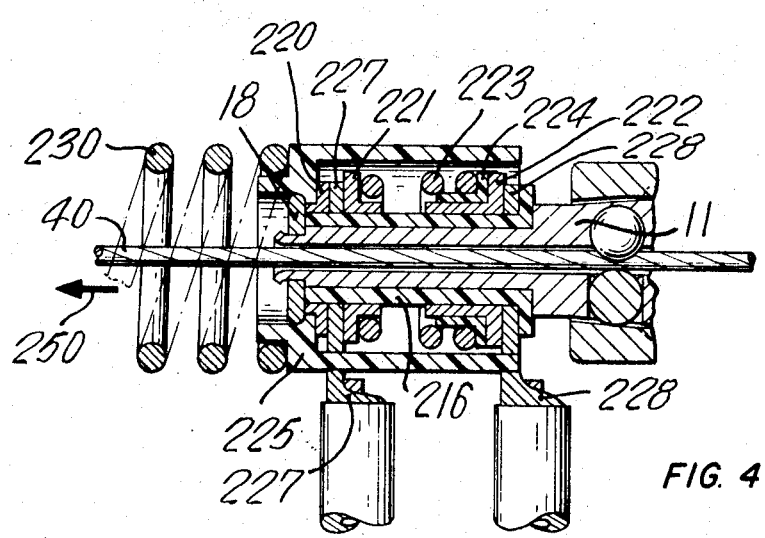
FIG. 4 is a fragmented sectional view of a still further embodiment.

Referring now to FIG. 4, there is shown a still further embodiment of the switch 10 where the switch employs both normally closed contact members and normally open contact members. Hereinshown, there are three contact members positioned about the insulating sleeve 216. A first contact member is constituted by the washer 18. The second contact member includes contact element 220 which is normally in contact with the connector lug 227 and a further contact element 221 by means of the helical spring 223 biased against the contact element 221. The contact element 220 is also in contact with the first contact 18 which is secured to the end of the body member 11 and from there to ground via the wire 40, as described hereinabove relative to FIG. 3. A third contact member 222 is biased away from the second contact member elements 221 and 220 by means of the helical spring 223. As shown, the other end of the helical spring 223 is insulated from the third contact member 222 by an insulating annular ring 224 positioned about the third contact member. Thus, in this condition, it can be seen that the first and second contact members are in a normally closed condition and in contact with ground while the third contact member is biased away from the first and second contact members. When the wire 40 is pulled to displace the body 11 through the cylindrical switch cover 225, the lug or first contact will disconnect from the second contact element 120 thus causing an open circuit condition between the connector lug 227 and ground. As the body 11 moves through the switch cover, in the direction of arrow 250, the helical spring 223 is being compressed and the third contact member moves closer to the second contact member until it comes in abutment therewith. At this instant, the connector lug 228 is in contact with the connector lug 227 causing a normally closed contact condition between the second and third contact members, that is to say, between both connector lugs 228 and 227. This condition is maintained throughout the compression of the conical helical spring 230 and when the wire 40 is released, the spring 230 starts its decompression and as soon as this decompression is terminated the helical spring 223 moves the third contact member 222 away from the second contact member element 221 thus causing normally open contact conditions. When the helical spring 223 has fully decompressed, the normally closed contact condition on connector lug 227 is reassumed placing the first and second switch contact members in contact with ground.

It is within the ambit of the present invention to cover any obvious modifications of the examples of the preferred embodiment described hereinabove.

I claim:

1. A cable activated switch comprising a switch support body having a through bore, a first switch contact member retained on said body, a second switch contact member slidingly retained on said body and insulated therefrom, clamping means for securing a cable extending through said bore, said clamping means having a circular body member with a tapered outer surface portion and a threaded outer portion, said cable extending in a through bore in said body member, at least one transverse bore extending from said tapered outer surface to said through bore, a ball in said transverse bore, said ball being of larger diameter than the depth of said transverse bore, a cylindrical locking sleeve having a tapered inner surface portion and threaded inner portion, said tapered inner surface portion extending substantially parallel to said tapered outer surface so that when said locking sleeve is threaded on said body said tapered inner surface will push said ball into said transverse bore to squeeze said cable on the through bore wall and rigidly retain said cable in said through bore, first resilient means for biasing said contact members, said first and second contact members being displaced relative to each other by predetermined axial movement of said cable.

2. A cable activated switch as claimed in claim 1, wherein there is provided second resilient means urging said contact members apart, said first resilient means causing movement of said contact members towards each other and responsive to said movement of said cable.

3. A cable activated switch as claimed in claim 2, wherein said switch support body is an elongated tubular body, said first and second switch contact members being positioned about said body and held in spaced apart relationships by said second resilient means said second resilient means being a helical spring abutting at opposed ends with a respective one of said contact members and at least one of its ends being in electrical insulating abutment with one of said contact members.

4. A cable activated switch as claimed in claim 3, wherein said first resilient means is a helical spring abutting at one end with said second switch contact member and electrically insulated therefrom and abutting at its other end with a stationary member located about said cable.

5. A cable activated switch as claimed in claim 4, wherein a switch cover of electrical insulating material is slidingly secured above said contact members, said first resilient means is a conical helical spring having a large diameter end as said one end and a small diameter as said other end, said large diameter end being in abutment with said switch cover, said switch cover also being in abutment with said second switch contact member.

6. A cable activated switch as claimed in claim 5, wherein an electrical insulating sleeve is retained about said support body, said first and second contact members being positioned on said sleeve, and an electrical connector secured to each said contact member for providing electrical connection thereto.

7. A cable activated switch as claimed in claim 4, wherein said cable is a metal wire, said metal wire having a protective casing terminating adjacent said cable activated switch to form an abutment surface for said stationary member and for said other end of said first resilient means.

8. A cable activated switch as claimed in claim 4, wherein said first resilient means has a higher compression rate than said second resilient means.

9. A cable activated switch as claimed in claim 1, wherein said circular body member is formed integrally with said switch support body, and wherein there are three spaced apart transverse bores in said body each receiving a respective metal ball therein.

10. A cable activated switch as claimed in claim 1, wherein there is provided a second resilient means urging said first and second contact members is abutment with each other.

11. A cable activated switch as claimed in claim 10, wherein said first resilient means abuts said second contact member and is electrically insulated therefrom, said first resilient means displacing said second contact member from abutment with said first contact member upon predetermined axial movement of said cable.

12. A cable activated switch as claimed in claim 11, wherein said second switch contact member includes two contact elements in abutment relationship with each other and with said first contact member.

13. A cable activated switch as claimed in claim 12, wherein there is provided second resilient means urging said contact members in contact with each other.

14. A cable activated switch as claimed in claim 13, wherein a third contact member is held in spaced apart relationship to said second contact member by said second resilient means.

15. A cable activated switch as claimed in claim 14, wherein said first resilient means abuts said second switch contact member and is electrically insulated therefrom, said first resilient means displacing said second contact member from abutment with said first contact member and into abutment with said third contact member upon predetermined axial movement of said cable.

* * * * *